United States Patent [19]

Lampert

[11] 4,362,318
[45] Dec. 7, 1982

[54] SUSPENSION SYSTEM INCLUDING AUXILIARY SPRING FOR LIGHTLY LOADED CONDITIONS

[75] Inventor: Albert J. Lampert, Los Angeles, Calif.

[73] Assignee: Cambria Spring Company, Los Angeles, Calif.

[21] Appl. No.: 196,288

[22] Filed: Oct. 14, 1980

Related U.S. Application Data

[63] Continuation-in-part of Ser. No. 891,847, Mar. 30, 1978, Pat. No. 4,226,441, which is a continuation-in-part of Ser. No. 783,661, Apr. 1, 1977, Pat. No. 4,175,772.

[51] Int. Cl.$^3$ .............................................. B60G 11/04
[52] U.S. Cl. ..................................... 280/718; 267/46; 267/19 R
[58] Field of Search ............... 280/718; 267/46, 54 R, 267/52, 45, 41, 44, 56, 8, 19 R

[56] References Cited

U.S. PATENT DOCUMENTS

| | | | |
|---|---|---|---|
| 1,558,017 | 10/1925 | Kintz | 267/46 |
| 1,900,497 | 3/1933 | Gitzendanner | 267/19 R |
| 2,954,970 | 10/1960 | Bernard | 267/45 |
| 3,194,580 | 7/1965 | Hamlet | 267/46 |
| 3,420,544 | 1/1969 | Dranes | 280/718 |
| 3,920,264 | 11/1975 | Lafferty | 280/718 |
| 4,175,772 | 11/1979 | Lampert | 280/718 |

*Primary Examiner*—Robert R. Song
*Attorney, Agent, or Firm*—Fulwider, Patton, Rieber, Lee & Utecht

[57] ABSTRACT

A vehicle suspension system including a mainspring connected to at least one axle of the vehicle, a hanger attached to the vehicle frame for retaining the mainspring while permitting vertical travel thereof within a predetermined range, and an auxiliary spring. A spring force multiplication mechanism connects the auxiliary spring to the mainspring so that the force exerted by the auxiliary spring is multiplied and applied to the mainspring, urging the mainspring toward the lower end of its travel range.

13 Claims, 5 Drawing Figures

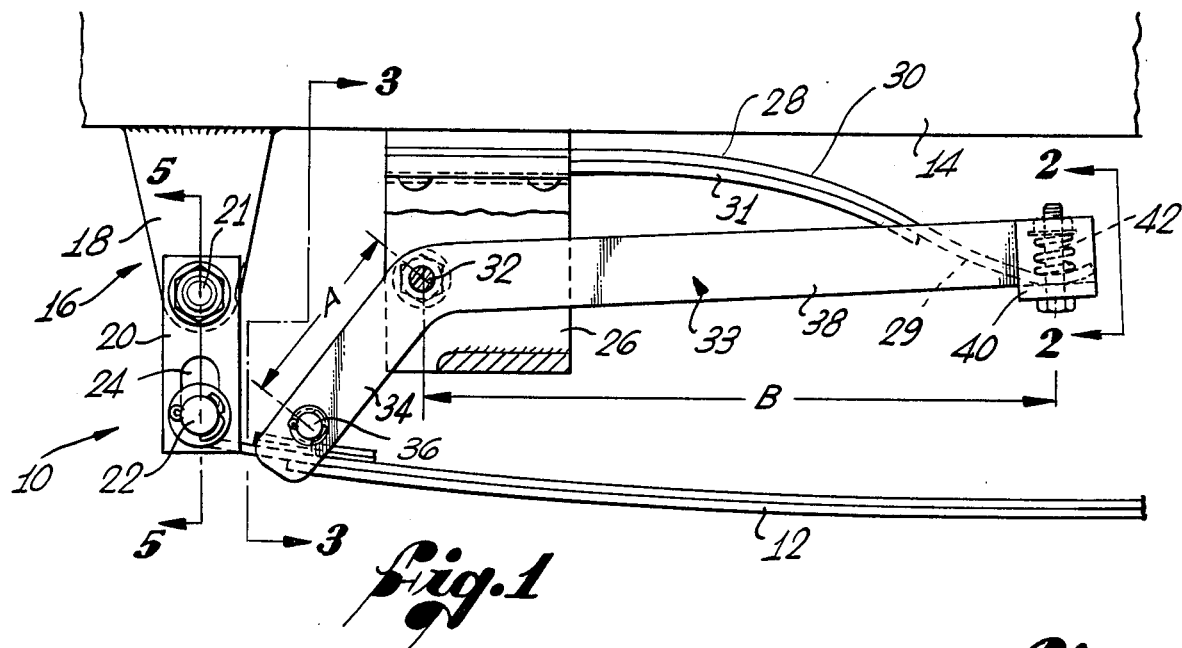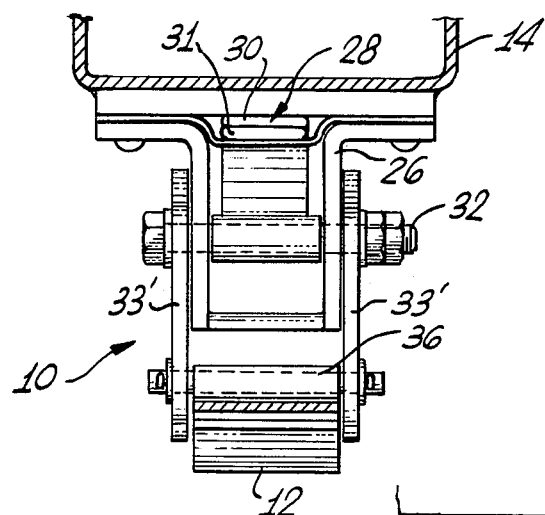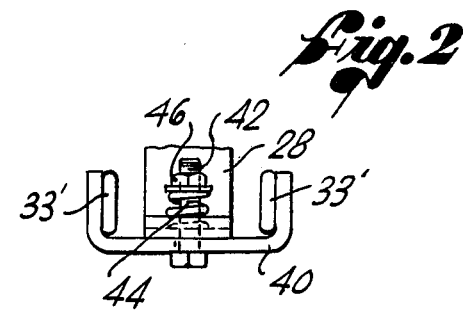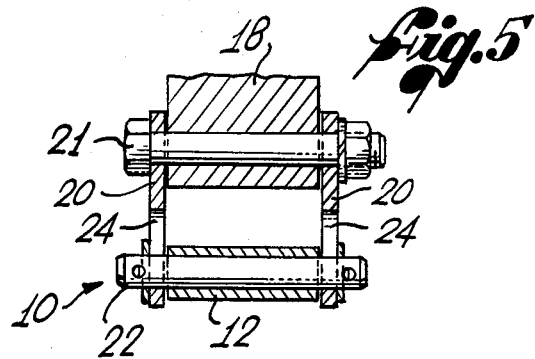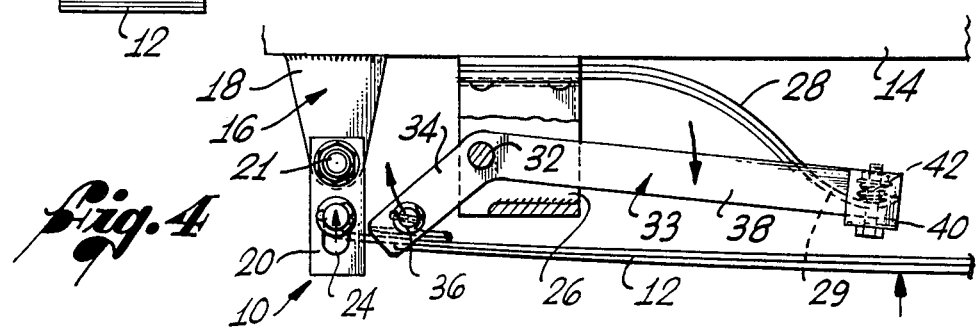

SUSPENSION SYSTEM INCLUDING AUXILIARY SPRING FOR LIGHTLY LOADED CONDITIONS

RELATED APPLICATION

This is a continuation-in-part of a related application Ser. No. 891,847 entitled: AUXILIARY VEHICLE SPRING FOR LIGHTLY LOADED CONDITIONS, filed on Mar. 30, 1978, now Pat. No. 4,226,441, which is in turn a continuation-in-part of application Ser. No. 783,661 entitled: VEHICLE SUSPENSION SYSTEM HAVING AUXILIARY SPRING FOR LIGHTLY LOADED CONDITION, filed on Apr. 1, 1977, now Pat. No. 4,175,772, issued on Nov. 27, 1979.

FIELD OF THE INVENTION

The present invention relates to vehicle suspension systems, and more particularly to such suspension systems that include an auxiliary spring for lightly loaded conditions.

BACKGROUND OF THE INVENTION

Trucks and other vehicles that are intended to carry heavy loads necessarily have relatively rigid springs. While these springs perform satisfactorily at the upper end of the load carrying capacity range of the vehicle, they can be ineffective at the lower end of the range. When the vehicle is empty, vibrations and abrupt wheel movements caused by the unevenness of the road surface can be transmitted to the vehicle frame, almost as if the vehicle were operated without springs.

It is known that the above problem can be overcome by the employment of an auxiliary spring arrangement such as that known as the Empty Ride ® system of the Cambria Spring Co. The hangers that secure the mainspring to the frame are modified in such a way that the mainspring can move, at least at one end, within a limited range of vertical travel. The mainspring is then biased toward the lower limit of its vertical travel by a smaller and lighter auxiliary spring positioned between the mainspring and the frame. Thus, in essence, the lightly loaded or empty vehicle rides on the auxiliary spring which has a spring rate appropriate for these conditions. When the vehicle is heavily loaded, however, the auxiliary spring is deflected sufficiently to move the mainspring to the upper limit of its vertical travel, and the vehicle is then dependent upon deflection of the mainspring to isolate the frame from road surface variations. Suspension systems of this type are described in previously issued U.S. Pat. Nos. 3,194,580 to Hamlet and 4,175,772 to Lampert.

The present state of the art in the development of auxiliary springs systems of the type described to above is generally satisfactory for systems of the type referred to herein as "wide ratio systems". In these systems the weight of the loaded axle to which the auxiliary spring is many times that of the empty vehicle. It is therefore possible, using previously known techniques, to fit an auxiliary spring having the desired spring rate between the mainspring and the frame. A persistent problem, however, to which a satisfactory solution has been sought for some time exists with respect to "close ratio systems" in which the weight of the unloaded vehicle, with respect to the axle in question, is relatively close to that of the unloaded vehicle. Since the mainspring and the auxiliary spring must be comparatively similar in size, it is often impossible to fit the auxiliary spring into the space available.

An important application of close ratio systems relates to the front axle of a tractor of the type commonly used to pull a semi-trailer. Only a small portion of the weight of the semi-trailer is transmitted to the front axle. Typically, the weight borne by the front axle of a loaded rig would be about double the weight borne by the front axle of the unloaded rig.

While the problem presented in this close ratio situation might at first appear to be less severe than the problems encountered with respect to the trailer in which the load fluctuations are much greater, it should be remembered that the comfort of the driver and the susceptibility of the driver to fatigue on long hauls must be considered. In fact, driver discomfort and fatigue in unloaded rigs is a major problem in the trucking industry. Moreover, the effectiveness of the suspension system with respect to the front axle relates directly to the performance of the steering system of the vehicle.

A principal objective of the present invention is to provide an auxiliary suspension system that can be readily employed in close ratio environments to improve the ride characteristics of a vehicle. Another objective is to provide an auxiliary spring suspension system which is adaptable to use in those situations in which only limited space is available for the installation of the auxiliary spring.

SUMMARY OF THE INVENTION

The above objectives are accomplished by a vehicle suspension system that includes a mainspring connected to at least one axle of a vehicle, a hanger attached to the frame of the vehicle to retrain the mainspring while permitting vertical travel thereof within a limited range, an auxiliary spring, and a spring force multiplication mechanism. This mechanism is connected to the auxiliary spring and the mainspring so that the force exerted by the auxiliary spring is multiplied and applied to the mainspring, urging the mainspring toward the lower end of its travel. The use of a relatively small auxiliary spring is thus permitted.

The spring force multiplication mechanism can advantageously take the form of a lever. More particularly, the lever can be pivotably mounted on a pin that may be immovably secured to the frame. The lever arm can then engage the mainspring at one end and the auxiliary spring at the opposite end. If this arrangement is employed, the engagement of the mainspring by the lever should be closer to the pivot point as compared to the engagement of the auxiliary spring by the lever.

It is advantageous to employ a connection of the lever to the auxiliary spring that facilitate the use of standard components with auxiliary springs of varying thicknesses and at the same time tends to dampen any vibrations transmitted through the lever. This type of connection can be accomplished by a connection pin that extends through the lever and the auxiliary spring and a connection spring, preferably encircling the pin, that tends to push the lever and the auxiliary spring together.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation of a vehicle suspension system constructed in accordance with the present invention, illustrated in a lightly loaded condition;

FIG. 2 is an end elevation of a fragmentary portion of the suspension system of FIG. 1 taken as indicated by arrow 2—2;

FIG. 3 is a cross-sectional view of the suspension system of FIG. 1 taken as indicated by the arrow 3—3.

FIG. 4 is a side elevation, similar to FIG. 1 but on a reduced scale, showing the suspension system in a heavily loaded condition; and FIG. 5 is a cross-sectional view taken as indicated by the arrow 5—5 in FIG. 1.

DESCRIPTION OF THE PREFERRED EMBODIMENT

A vehicle suspension system 10, constructed in accordance with the present invention and illustrated in FIGS. 1 through 5 of the accompanying drawings, includes a conventional multi-leaf mainspring 12 that is connected to the frame 14 of a vehicle by a hanger 16. The mainspring 12 is connected to the front axle of a vehicle in the conventional manner as shown in FIG. 1 of U.S. Pat. No. 4,175,772.

The hanger 16 has been modified to permit one end of the mainspring 12 to move vertically within a limited range of travel. It includes a downwardly projecting member 18, welded to the frame 14 and having a link 20 pivotably connected to its lower end. At the end of the spring 12 is a cross pin 22 received by a pair of vertically elongated slots 24 in the link 22, as best shown in FIGS. 1, 4 and 5. Vertical travel of the spring 12 is permitted by movement of the cross pin 22 in the slot 24 (the pin being shown at the bottom of the slot in FIG. 5) and by pivotal action of the link 20 about a mounting pin 21. Those skilled in the art will understand that a wide variety of alternative hanger constructions can be employed to permit vertical travel of the mainspring 12.

A bracket 26 is bolted to the frame 14 so that it projects downwardly toward the mainspring 12. Secured to the top of this bracket 26 near the bottom of the frame 16 is an auxiliary leaf spring 28. This auxiliary spring 28 extends from the bracket 26 away from the hanger 16, between the frame 14 and the mainspring 12, and generally parallel to the mainspring 12. Having a slightly S-shaped curvature, the auxiliary spring 28 is spaced below the frame 14 at its movable end 29 (opposite the bracket 26) so that the frame does not interfer with flexing of the auxiliary spring. In this embodiment, the auxiliary spring 28 has two leaves 30 and 31, the lower leaf 31 being shorter. It will be understood, however, that the optimum contruction of the auxiliary spring 28 is dependent upon the spring rate required and the room available.

A pivot pin 32 extends horizontally from the bracket 26 and cross-wise with respect to the frame 14 between the auxiliary spring 28 and the mainspring 12. A lever 33 of a dog-leg configuration is pivoted on the pin 32. It is made of two parallel side pieces 33' (see FIGS. 2 and 3) that act in unison as a single lever. The side pieces 33' form a bifurcated first arm 34 that is angled downwardly from the pivot pin 32 toward the auxiliary spring 12 (see FIGS. 2 and 4). A rotatable cross piece 36 connects the two side pieces 33' at the end of the first arm 34, as best shown in FIG. 3, and rests on the generally horizontal top surface of the mainspring 12.

A second arm 38 of the lever 33 is longer than the first arm 34 and forms an oblique angle with the first arm. It has an upwardly facing U-shaped member 40 that connects the two side pieces 33' at one end and receives the movable end 29 of the auxiliary spring 28.

A connection pin 42 extends through aligned apertures in the U-shaped member 40 and the auxiliary spring 28. A connection spring 44 encircles the pin 42, being retained at its top end by a nut 46 that threadedly engages the pin 42, so that the connection spring 44 resiliently urges the auxiliary spring 28 and lever 33 together. Apart from the effect of the connection spring 44, the lever 33 and the auxiliary spring 28 are positively connected by the connection pin 42 so as to permit only limited separation.

The operation of the suspension system 10 described above will now be explained. Assuming that the vehicle is lightly loaded, the upward pull of the auxiliary spring 28 on the lever 33 causes the first arm 34 of the lever to move downwardly, pushing the mainspring 12 to the lower limit of its vertical travel, as shown in FIG. 1. Flexing of the auxiliary spring 28 will then permit movement of the frame 16 relative to an axle (not shown) to which the mainspring 12 is connected. It is important to note that the lever 33 and its pivot pin 32 not only apply the force of the auxiliary spring 28 to the mainspring 12, but also serve as a mechanism for muliplying this force. The multiplication of the force is achieved because the distance "A" from the pivot pin 32 to the engagement of the mainspring 12 by the cross piece 36 of the lever 33 is considerably less than the distance "B" from the pivot pin to the connection of the lever to the auxiliary spring 28. For this reason, the auxiliary spring 28, which can fit readily within the limited space available between the frame 14 and the mainspring 12, can provide the force necessary even in this close ratio system in which the auxiliary spring might typically be required to provide a spring rate of about half that of the mainspring.

If the load is increased sufficiently, the auxiliary spring 28 will deflect downwardly, allowing its movable end 29 to move downwardly with the second arm 38 of the lever 33 so that the mainspring 12 can move upwardly to the upper limit of its range of vertical travel permitted by the hanger 16 (see FIG. 4). The mainspring 12 then has a fixed position with respect to the frame 14 and the frame is supported by the suspension system 10 with an appropriately high effective spring rate to handle the load imposed.

It should be noted that the manner of connecting the auxiliary spring 28 to the lever 33 is highly effective and advantageous. Standard components can be used to connect the auxiliary spring 28 even though the vertical thickness of that spring may vary depending upon the parameters required by an individual installation. A thicker auxiliary spring will simply cause the connection spring 44 to be compressed to a greater extent. Moreover, the resiliency of the connection will tend to dampen any vibrations transmitted through the lever 33.

It will be understood from the following that while particular forms of the invention have been illustrated and described, various modifications can be made without departing from the spirit and scope of the invention. Accordingly, it is not intended that the invention be limited except as by the appended claims.

I claim:

1. In a vehicle having a frame, an axle, at least one wheel mounted on said axle, a suspension system comprising:
   a main spring connected to said axle and urging said axle away from said frame;
   hanger means attached to the frame of said vehicle for retaining said main spring while permitting vertical travel thereof within a predetermined vertical range;
   an auxiliary spring; and
   spring force multiplication means for multiplying the force of said auxiliary spring and for applying said force to said main spring so as to urge said main spring toward the lower end of said range.

2. The suspension system of claim 1 wherein said spring force multiplication means comprises a pivotable lever.

3. The suspension system of claim 2 further comprising connection means for securing said lever to said auxiliary spring and for resiliently urging said lever and said auxiliary spring together.

4. The suspension system of claim 2 further comprising:
   a connection pin extending through said lever and said auxiliary spring; and
   means carried by said pin for resiliently urging said lever and said auxiliary spring together.

5. The suspension system of claim 2 further comprising:
   a connection pin extending through said lever and said auxiliary spring; and
   connection spring means encircling said connection pin and urging said lever and said auxiliary spring together.

6. The suspension system of claim 1 wherein said spring force multiplication means comprises:
   a pivot pin attached to said frame; and
   a lever pivotable on said pin, connected to said mainspring at one end thereof, and connected to said auxiliary spring at the opposite end thereof.

7. The suspension system of claim 1 wherein said spring force multiplication means comprises:
   a pivot pin attached to said frame;
   a lever pivotable on said pin, said lever being connected to said mainspring at a first end thereof and being connected to said auxiliary spring at a second end thereof, said first end being closer to said pivot pin than is said second end.

8. In a vehicle suspension system having a mainspring of the leaf type disposed beneath the vehicle frame and extending therealong and hanger means attached to the frame for retaining the mainspring while permitting vertical travel thereof within a predetermined range, the improvement of a close ratio auxiliary spring for enhanced the ride characteristics of the vehicle under lightly loaded conditions comprising:
   an auxiliary spring secured to said frame between said frame and said mainspring;
   a pivot pin connected to said frame; and
   a lever pivoted on said pin and connected to said mainspring and said auxiliary spring, the connection of said lever to said mainspring being closer to said pivot point as compared to the connection of said lever to said auxiliary spring, whereby said lever multiplies the force applied to said mainspring by said auxiliary spring to urge said mainspring toward the lower end of its range of travel.

9. The apparatus of claim 8 wherein said auxiliary spring is a leaf spring that extends along said frame parallel to said mainspring.

10. The apparatus of claim 9 wherein said lever is connected to said mainspring at one end and to said auxiliary spring at the other end thereof.

11. The apparatus of claim 8 further comprising a bracket extending downwardly from said frame by which said pivot pin is connected to said frame.

12. The suspension system of claim 8 further comprising connection means for securing said lever to said auxiliary spring and for resiliently urging said lever and said spring together.

13. In a vehicle suspension system having a mainspring of the leaf type disposed beneath the vehicle frame and extending therealong and hanger means attached to said frame for retaining said mainspring while permitting vertical travel thereof within a predetermined range, the improvement of a close ratio auxiliary spring for enhanced ride characteristics under lightly loaded conditions comprising:
   an auxiliary spring of the leaf type secured to said frame between said frame and said mainspring and extending along said frame parallel to said mainspring;
   a bracket extending downwardly from said frame;
   a pivot pin secured to said bracket so as to be immovable with respect to said frame;
   a lever pivoted on said pin, engaging said mainspring at one end, and engaging said auxiliary spring at its opposite end, the engagement of said mainspring by said lever being closer to said pivot pin than the engagement of said auxiliary spring by said lever, whereby said lever multiplies the force applied to said mainspring by said auxiliary spring to urge said mainspring toward the lower end of its range of travel;
   a connection pin extending through said lever and said auxiliary spring; and
   a connection spring encircling said connection pin and urging said lever and said auxiliary spring together.

* * * * *